United States Patent [19]
Carlucci

[11] 4,114,697
[45] Sep. 19, 1978

[54] FINGER WHEEL

[76] Inventor: James J. Carlucci, 716 Monroe Ave., Los Banos, Calif. 93635

[21] Appl. No.: 788,263

[22] Filed: Apr. 18, 1977

[51] Int. Cl.² .................. A01B 21/04; A01B 35/26
[52] U.S. Cl. ............................ 172/543; 56/377; 172/556
[58] Field of Search ............ 172/543, 556, 544, 96; 56/400, 377; 130/22 A

[56] References Cited

U.S. PATENT DOCUMENTS

| 3,151,431 | 10/1964 | Daugherty | 56/377 X |
| 3,175,347 | 3/1965 | Scheidenhelm | 56/400 |
| 3,314,486 | 4/1967 | Remy | 172/543 |
| 3,401,753 | 9/1968 | Bezzerides | 172/543 |
| 3,796,269 | 3/1974 | Carlucci | 172/158 |

FOREIGN PATENT DOCUMENTS 809,841 3/1959 United Kingdom ............... 172/543

OTHER PUBLICATIONS

Netherlands App. No. 6,510,486, Mulder 10/1965.
Netherlands App. No. 6,414,969, Mulder 6/1966.

Primary Examiner—Richard J. Johnson
Attorney, Agent, or Firm—Huebner & Worrel

[57] ABSTRACT

A finger wheel for use in an agricultural implement having a substantially circular unitary backing plate with a plurality of bosses disposed in a circle concentric to the backing plate adjacent to the periphery thereof and projecting axially therefrom and with a plurality of anchors disposed in a circle concentric to the backing plate centrally of the bosses and spaced between alternate pairs of bosses; a plurality of bifurcated substantially identical finger elements each of continuous wire material individually related to the anchors, each having a pair of helical coils individually slidably fitted in circumscribing relation to the bosses adjacent to their respective anchor, a return bend connecting the pair of coils, and a pair of fingers individually extending from the coils radially outwardly from the backing plate; and arcuate clamping plates releasably mounted on the backing plate overlaying the bosses and the anchors and capturing the finger elements thereon.

7 Claims, 10 Drawing Figures

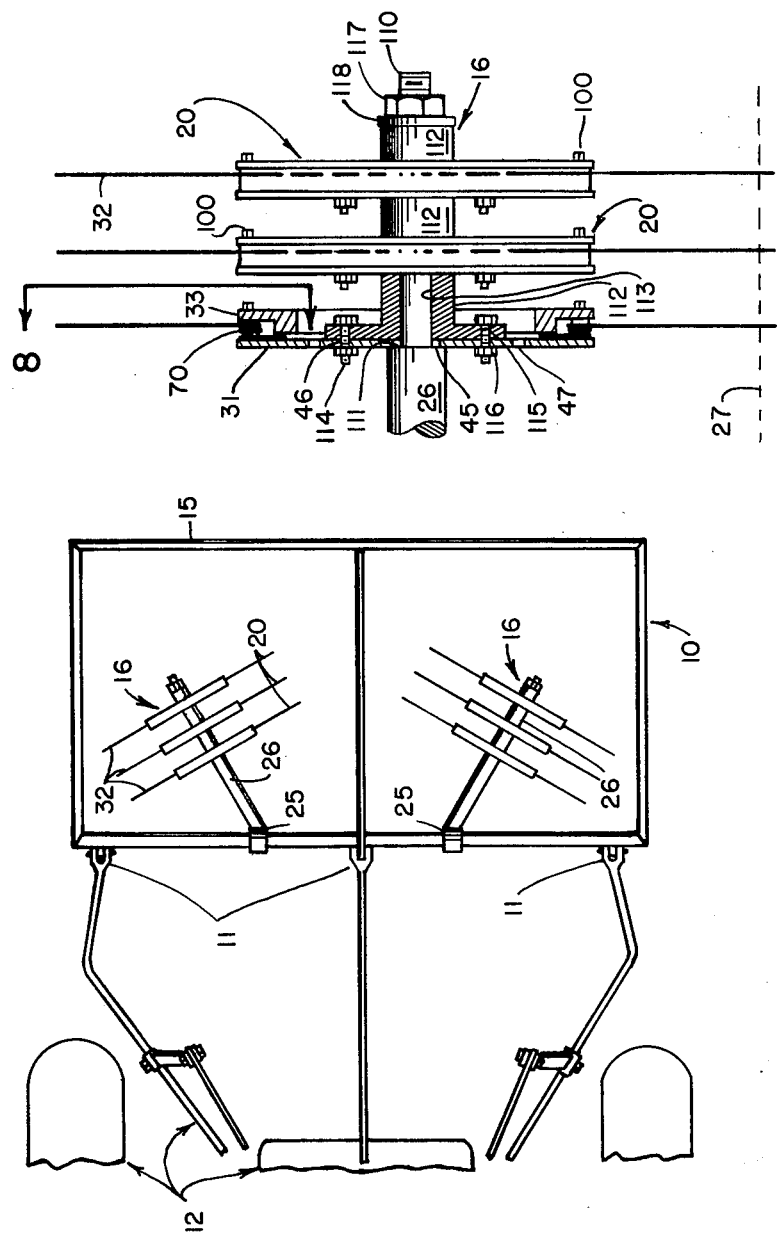

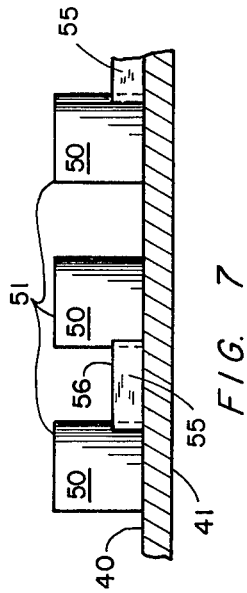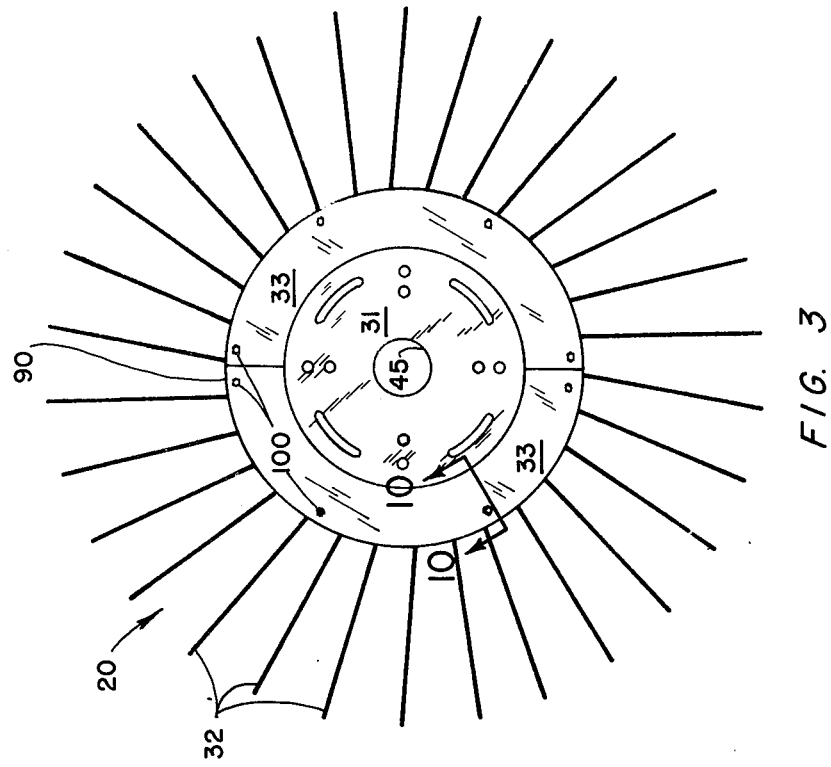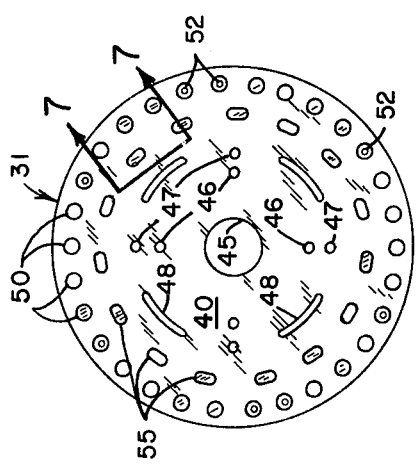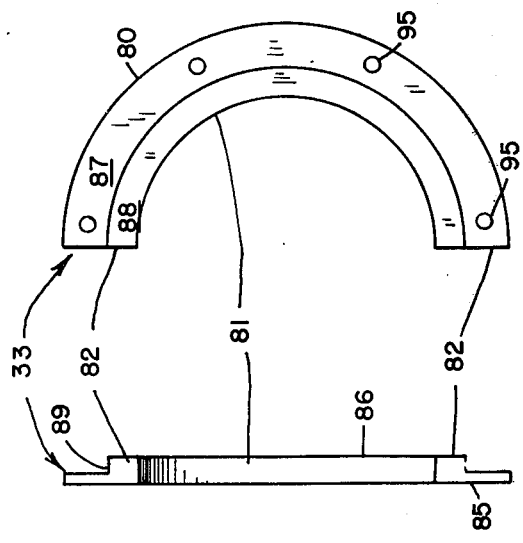

FINGER WHEEL

BACKGROUND OF THE INVENTION

1. Field of the Invention

The present invention relates to a finger wheel for use in agricultural implements, and more particularly to such a wheel having outwardly extending resilient fingers which are quickly and easily replaceable.

2. Description of the Prior Art

Wheels having outwardly extending resilient fingers have been popularly employed in cultivators, rakes, windrow turners and other implements. However, such wheels have a number of deficiencies, especially when employed for agricultural cultivation, where such a wheel should be relatively inexpensive, extremely sturdy, adapted for mounting on various types of implements, for rotation in either direction, and capable of being repaired in the field with simple tools in close quarters. It is particularly desirable that the fingers of such wheels be quickly and easily replaceable for repair purposes. While existing finger wheels are satisfactory in certain of these respects, no one type of such wheel known to the applicant is satisfactory in all of these respects.

Finger wheels with radially extending resilient fingers are disclosed in U.S. Pat. No. 3,796,269 entitled "Cultivator" issued to the present applicant on Feb. 10, 1974 and in U.S. Pat. No. 3,314,486 entitled "Agricultural Implements" issued to A. A. L. Remy on Apr. 18, 1967.

OBJECTS AND SUMMARY OF THE INVENTION

It is an object of the present invention to provide an improved finger wheel provided with outwardly extending resilient fingers.

Another object is to provide such a wheel which is relatively inexpensive, has a limited number of elements of relatively simple shapes and employs a plurality of substantially identical elements wherever feasible.

Another object is to provide such a wheel in which elements requiring renewal are replaceable in the field using a few simple tools and with relatively limited disassembly of the wheel.

Another object is to provide such a wheel which can be conveniently mounted in various positions on various types of agricultural implements.

Another object is to provide a finger wheel which the fingers are quickly and easily replaceable.

Further objects and advantages are to provide improved elements and arrangements thereof in a finger wheel for the purposes described which is dependable, of sturdy construction, and fully effective to accomplishing its intended purposes.

BRIEF DESCRIPTION OF THE DRAWINGS

FIG. 1 is a top plan view of a cultivator utilizing a plurality of finger wheels embodying the principles of the present invention showing the cultivator mounted for earth traversing movement on a fragmentarily represented tractor with the cultivator and tractor indicated by dashed lines.

FIG. 2 is an edge elevation at a scale larger than that of FIG. 1 of a plurality of the finger wheels mounted coaxially and engaging a soil surface indicated by a dashed line with one of the wheels being shown in diametric section to illustrate a mounting arrangement thereof and the balance of the wheels schematically represented for illustrative convenience.

FIG. 3 is an axial view of an individual finger wheel of the present invention.

FIG. 4 is an axial view of a circular backing plate utilized in the finger wheel.

FIG. 5 is an axial view of a clamping plate utilized in the finger wheel.

FIG. 6 is an edge view of the clamping plate of FIG. 5.

FIG. 7 is a fragmentary view at an enlarged scale of the backing plate taken on line 7—7 of FIG. 4.

DESCRIPTION OF THE PREFERRED EMBODIMENT

Figure 8:
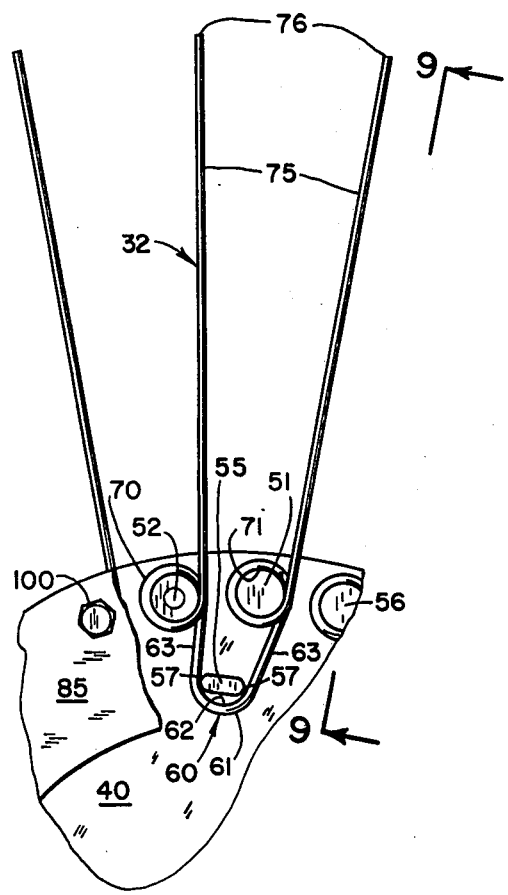
FIG. 8 is a fragmentary section at an enlarged scale taken on line 8—8 of FIG. 2 showing a bifurcated finger element utilized in the finger wheel and arrangments for mounting the finger element.

Referring in greater detail to the drawings, in FIG. 1 is shown an agricultural cultivator, indicated generally by the numeral 10, connected by a conventional three point hitch 11 to a tractor 12 for earth traversing movement therewith. The cultivator has a rectangular frame 15 on which is mounted a pair of groups 16 of a plurality of finger wheels 20, each embodying the principles of the present invention. Each group of finger wheels is mounted to the frame of the cultivator by clamp 25 which has an axle 26 extending substantially horizontally therefrom and angularly related to said direction of earth traversing movement defining an axis of rotation. As best shown in FIG. 2, the finger wheels are mounted on the axle in a manner subsequently to be described for individual free rotation about the axis of rotation defined by the axle. The axle can be positioned by the three point hitch at an elevation such that the peripheries of the wheels engage a soil surface 27.

It is to be understood that the environment of the finger wheels 20 depicted in FIGS. 1 and 2 is for illustrative purposes, and that different numbers of wheels can be employed in each group 16, the wheels in each group can be rigidly connected to rotate as a group, the wheels can be mounted individually rather than grouped, any reasonable number of groups of wheels can be obliquely disposed to the direction of movement for ground driven or power driven rotation, and implements in addition to the wheels may be mounted on the frame.

Figure 9:
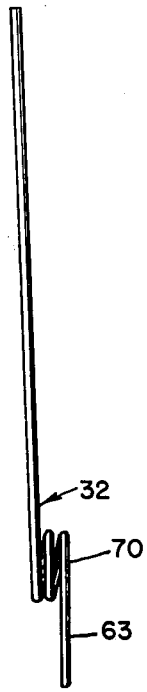
FIG. 9 is a view of the finger element of FIG. 8 as seen from line 9—9 of FIG. 8.

Each finger wheel 20 has a backing plate indicated generally by the numeral 31 and best shown in FIG. 4, a plurality of finger elements each indicated generally by the numeral 32 and best shown in FIG. 9, and a plurality of clamping plates each indicated generally by the numeral 33.

The backing plate 31 is of substantially circular form having an axially disposed mounting face 40 which is generally planar, except for certain projections subsequently to be described, and having a substantially planar reverse face 41 axially opposite of the mounting face and parallel thereto. The backing plate has a concentric central circular opening 45 of relatively small diameter compared with the outside diameter of the backing plate. The backing plate has eight small circular openings 46 and 47 of a substantially equal diameter smaller than the diameter of the central opening and having axes substantially parallel therewith. Four of the small circular openings, indicated by the numeral 46, are equally circumferentially spaced about a first circle somewhat larger in diameter than the central opening and concentric thereto, and the remaining four of the smaller circular openings, indicated by the numeral 47, are arranged in equally circumferentially spaced relation about a second circle somewhat larger in diameter than the circle of the circular openings 46 and concentric to the backing plate. Pairs of openings 46 and 47 are disposed along a common radius of the backing plate, as best shown in FIGS. 3 and 4. The backing plate has four arcuate slots 48 with semicircular ends lying substantially along the second circle of the openings 47 and alternating therewith. The circular openings 45, 46 and 47 and the slots 48 are provided for flexibility in mounting the backing plate, and any or all of them may be utilized in any arrangement in any installation of the finger wheel 20. Of course, other arrangements for mounting the finger wheel may be provided.

The backing plate 31 is provided on its mounting face 40 with a plurality of substantially identical bosses 50 equally circumferentially spaced in a circle somewhat smaller in diameter than that of the backing plate and substantially coaxial therewith. Each of the bosses is substantially cylindrical, having its axis disposed substantially parallel to the axis of the backing plate. The bosses project from the mounting face to a substantially planar axial end 51 which is substantially parallel to the mounting face. The bosses are disposed in a circle toward the periphery of the backing plate and substantially concentric thereto and are substantially equally spaced circumferentially along said circle a distance approximately equal to the diameter of each boss. Any reasonable even number of bosses can be provided; thirty being provided in the embodiment shown. Eight of the bosses have screw threaded bores 52 extending substantially centrally axially thereof from the planar axial end of said bosses for a purpose subsequently to be described.

A plurality of protuberances or anchors 55 extend from the mounting face to substantially planar axial ends 56 substantially parallel to the mounting face. The anchors are disposed in a circle concentric to the backing plate and somewhat smaller in diameter than the circle of bosses with an anchor being substantially centrally disposed between alternate bosses; fifteen anchors being provided in the embodiment shown. The axial ends 56 of the anchors, preferably, are spaced axially from the mounting plate somewhat less than one third of the distance that the axial ends 51 of the bosses are spaced from the mounting face. Viewed axially as in FIG. 8, each anchor has an elongated bar shaped cross section longitudinally extending substantially tangentially to the circle in which the anchors are disposed and having longitudinally opposite semicylindrical ends 57. Viewed radially of the backing plate, as in FIG. 7, but best shown in FIGS. 3 and 8, each anchor extends longitudinally between its adjacent pair of bosses a distance somewhat greater than the space between said pair of bosses.

The backing plate 31 together with the bosses 50 and anchors 55 preferably is of unitary construction, such as being cast of aluminum. The central opening 45, circular openings 46 and 47, and arcuate slots 48 preferably are formed when the backing plate is cast. These openings and slots can, of course, be finished to relatively close tolerances or formed initially in any other convenient manner desired.

The finger wheel 20 has, as previously mentioned, a plurality of bifurcated finger elements 32, best shown in FIGS. 8 and 9. Each finger element is individually related to an anchor 55 and to the pair of bosses 50 adjacent thereto. Each finger element preferably is of unitary construction being formed from a continuous length of resilient material such as spring steel wire. Each finger element has a U-shaped bight or return bend 60 having a central portion 61 with a concave side 62 and having a pair of opposite legs or ends 63 extending from the central portion. The return bend is dimensioned and proportioned so that it can be positioned on the backing plate 31 with the central portion of the bend disposed toward the center of the backing plate from an anchor 55 with the concave side positioned about said anchor, and with the opposite ends of the bend extending substantially parallel to the mounting face 40 and oppositely of and beyond the semicylindrical ends 57 of the anchor so that the anchor is loosely fitted between the opposite ends of the return bend.

Each of the pair of opposite ends 63 of the return bend 60 individually extends to and joins a helical coil 70 defining a central opening 71 of such a diameter that the coil is axially slidably fitted about a boss 50. The overall axial length of each helical coil is somewhat less than the axial length of the bosses. The pair of helical coils of each finger element 32 are wound in a common direction, counter clockwise as viewed in FIG. 8. The return bend is so proportioned and dimensioned that the finger element can be slidably fitted by said coils to an adjacent pair of bosses with the opposite ends of the return bend extending generally radially of the backing plate to join their respective helical coils at the corresponding sides of the bosses. Each helical coil is proportioned so that, when the finger element is engaged in the manner described with a pair of bosses, the coil is wound away from the mounting face in two substantially complete turns. A finger 75 extends linearly substantially along the line of its respective leg 63 from each helical coil to a tip 76. The fingers can, of course, be formed in any other desired configuration, curved, angular or straight, outwardly of the backing plate.

Figure 10:
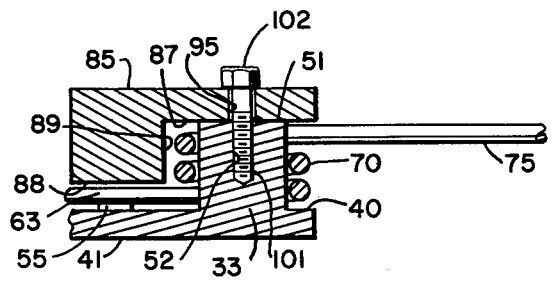
FIG. 10 is a fragmentary section at an enlarged scale taken on line 10—10 of FIG. 3 further showing the mounting arrangements of the finger element.

The finger wheel 20 has a pair of substantially identical clamping plates 33, best shown in FIGS. 5 and 6, mounted on the backing plate 31, as best shown in FIGS. 3 and 10. Each clamping plate is of arcuate shape having a convex substantially semicircular outer edge 80, a concave substantially semicircular inner edge 81 substantially concentric to the outer edge, and a pair of substantially planar opposite sides 82. The outer edge is curved to a radius substantially equal to the radiius of the periphery of the backing plate, and the inner edge is curved to a radius somewhat less than the radius of the circle in which the anchors 55 are disposed. The opposite sides of the clamping plate substantially lie in respective planes each perpendicular to the mounting face 40 containing the diameter of a circle concentric to the edges 80 and 81 of the clamping plate. Each clamping plate has a planar face 85 substantially perpendicular to the axis of the edges of the clamping plate and an axially opposite retaining face 86 having a first, outward arcuate planar surface 87 and a second, inward arcuate planar surface 88 which is substantially parallel to the face 85. The inward surface is spaced from the face 85 a greater distance than is the outward surface, and the inward and outward surfaces are joined by a semicylindrical step surface 89 substantially concentric to the outer and inner edges of the clamping plate.

The clamping plates 33 are so dimensioned and proportioned that their retaining faces 86 can be mounted in overlaying relation to the mounting face 40 of the backing plate 31 with the clamping plates in coaxial relation concentric thereto, and with the opposite sides 82 of the clamping plates juxtapositioned. When the clamping plates are so positioned, they form a ring, best shown in FIG. 3, substantially concentric to and overlaying the backing plate with the opposite sides of the plates extending radially of the ring. The clamping plates are also dimensioned and proportioned so that when so mounted on the backing plate, their step surfaces 89 are somewhat centrally disposed from the helical coils 70; their first, outer surfaces 87 engage the axial ends 51 of the bosses 50; and their second, inward surfaces 88 are juxtapositioned to the axial ends 56 of the anchors 55. Each clamping plate has four bores 95 extending axially therethrough. Each of said bores is positioned so as to be aligned with one of the eight screw threaded bores 52 in the axial ends of the bosses when the clamping plate is mounted on the backing plate. A conventional cap screw 100, having a screw threaded shank 101 and a head 102, is provided for each pair of aligned bores 52 and 95. Although two clamping plates are utilized in the described embodiment, a greater number can be utilized by dividing the ring 90 substantially along equally angularly related radii of the ring so that each clamping plate extends over fewer than half of the finger elements 32.

The finger wheel 20 is assembled by sliding the helical coils 70 of each of the finger elements 32 over their respective pairs of bosses 50 having an anchor therebetween with the anchor disposed centrally of the return bend 60. When the finger elements are positioned, one of the clamping plates 33 is mounted on the backing plate 31 with the first surface 87 of the retaining face 86 engaging the axial ends 51 of the bosses so that the coils of the finger elements are retained about the bosses between the clamping plate and the backing plate. The clamping plate is then rotated about the axis of the backing plate until its respective bores 95 are aligned with the appropriate bores 52 in the bosses, and the cap screws 100 are screw threadably engaged with the bores 52 and tightened therein to draw the heads 102 of the cap screws into engagement with the planar face 85 of the clamping plate to secure the clamping plate to the backing plate. The remaining clamping plate is then mounted on the backing plate with its opposite sides 82 individually juxtapositioned to the opposite sides of the first clamping plate to be installed and is then secured to the backing plate by the remaining cap screws.

An assembled finger wheel 20 of the present invention can be mounted in any desired manner, a typical mounting being shown in FIG. 2 in which three of said wheels are coaxially mounted in axial juxtaposition for free and independent rotation along a common axle 26 having a distal end provided with screw threads 110 and a shoulder 111. Each of the wheels has a hub 112 having a central bore 113 fitted for rotational movement to the axle. Each hub is mounted on its respective wheel with the bore 113 concentric to the wheel by a plurality of bolts 114 extending through suitable openings 115 in the hub and through the circular openings 46 on the wheel. The bolts are secured by nuts 116 engaging the bolts. The wheels are "stacked" on the axle to form a group 16 of wheels in which the axle is inserted through the central bore of the hub of each wheel so that the first wheel placed on the axle engages the shoulder 111. The wheels are secured to the axle by a nut 117 positioned on the axle outwardly of the last wheel placed on the axle and screw threadably engaging the screw threads thereof. A washer 118 is positioned axially between the last wheel and the nut 117.

OPERATION

The operation of the preferred embodiment of the present invention is believed to be clearly apparent and is briefly summarized at this point. The cultivator 10 is drawn in the conventional manner over the soil surface 27 by the tractor 12 connected to the hitch 11 with the axle 26 elevationally positioned so that the tips 76 of the fingers 75 of the finger wheels 20 engage the soil surface. As the tractor moves along the soil surface the finger wheels, together with their connected fingers, are rotated in the conventional manner by the force developed by the engagement of the fingers with the soil surface. Since, as shown in FIG. 1, the axes of the wheels are obliquely related to the direction of movement of the cultivator, such rotation rakes or claws material engaged by each wheel in the path along the direction of movement to one side of said path.

As the fingers 75 engage the soil surface they are forced rearwardly of the direction of movement of the cultivator 10. Such a rearward force is absorbed by bending of the resilient fingers and, depending on the direction of rotation of the wheel 20 on which the fingers are mounted, by coiling or uncoiling of the helical coils 70 about the bosses 50. The return bends 60 prevent rotation of their respective helical coils about the retainers by engagement of the opposite ends 63 of the bends with the respective semicylindrical ends 57 of the anchors 55. Shocks due to irregularities of the soil surface encountered by the tips are absorbed by the resilient bending or coiling action, respectively, of the fingers and coils.

Since the anchors 55 are centrally positioned between their adjacent bosses 50 circumferentially of the backing plate 31 and since the return bend 60 of each finger element 32 is centrally disposed between the helical coils 70 of the finger element, the finger element can be arranged for opposite rotation of the finger wheel 20 by simply inverting the finger element in relation to the backing plate 31. Since the finger elements are slidably fitted to their respective bosses and anchors, installation of the finger elements on the backing plate can be performed without tools and without expending any effort in "winding up" the coils. If a finger or a helical coil breaks, as is frequently the case with resilient fingers used in agricultural cultivation, the finger element involved can be conveniently replaced in the field. This replacement is convenient even if the element is mounted on a wheel which is relatively closely positioned axially to an adjacent wheel, as shown in FIG. 2, in a group 16 of wheels. The heads 102 of the cap screw 100 securing the clamping plates 33 can be engaged for rotation from a direction radially related to the wheel. Only the clamping plate retaining the broken finger element need be removed. This can be done by first moving the clamping plate axially of the wheel a distance slightly greater than the axial length of the step surface 89 to disengage it from the remaining clamping plate and the helical coils and then removing the clamping plate from between the adjacent finger wheels. Such replacement of a broken finger element is facilitated, as are all assembly and disassembly operations involving the finger wheels, by the relatively light weight of the elements and their relatively loose or sliding fits to related elements, and by the need for no tools except to initially loosen, or finally tighten, the cap screws 100.

In addition to its ease of repair the finger wheel 20 of the present invention is advantageously employed in cultivators 10, or the like, because of its convenience for mounting for rotation in either direction and in a variety of arrangements with other similar finger wheels and because of its relatively low cost due to the limited number of elements required and their relatively simple shapes and construction.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A finger wheel comprising:
   A. a substantially circular backing plate;
   B. a plurality of substantially identical substantially cylindrical bosses having axes substantially parallel to the axis of the backing plate and projecting ends disposed in a plane substantially parallel to the backing plate and axially spaced thereof, said bosses being substantially equally spaced in a circle substantially concentric to the packing plate and adjacent to the periphery thereof;
   C. a plurality of substantially identical anchors extended axially from the backing plate and providing ends disposed in a plane substantially parallel to the backing plate between the backing plate and the plane of said ends of the bosses, said anchors being disposed in a circle substantially concentric to the backing plate and somewhat smaller in diameter than the circle in which the bosses are disposed and being circumferentially spaced centrally between alternate adjacent pairs of said bosses;
   D. a plurality of substantially identical, bifurcated finger elements individually related to each of said anchors, each finger element having
      (1) a return bend centrally fitted about its respective anchor with opposite ends extending outwardly of the backing plate,
      (2) a pair of helical coils of resilient material individually continuous with said opposite ends and individually slidably fitted in circumscribing relation about the bosses adjacent to said respective anchor, and
      (3) a pair of fingers of resilient material individually continuous with the helical coils and extending radially outwardly of the backing plate from their respective coils; and
   E. arcuate plates releasably mounted on the backing plate forming a ring substantially concentric thereto in overlaying relation to the bosses and the anchors wherein each of said finger elements is of unitary construction of resilient material and has its return bend positioned against the backing plate, said opposite ends individually extending substantially radially of the backing plate toward corresponding sides of the bosses which are circumscribed by the helical coils of the finger element, and its helical coils wound from their respective connections to the ends of the return bend in a common direction about their respective bosses and away from the backing plate in at least one complete turn so that the fingers extend in substantial alignment with the opposite ends of the return bend.

2. The finger wheel of claim 1 in which the clamping plates are in facing engagement with the projecting ends of the bosses to capture the coils thereon and the clamping plates are at all points spaced from the backing plate a distance greater than the thickness of the portions of the finger elements disposed therebetween for flexing movement of said finger elements relative to the backing plate and the clamping plates about said bosses.

3. A finger wheel comprising:
   A. a substantially circular backing plate having an axial opening, an even numbered plurality of substantially cylindrical bosses integral with the plate disposed in a circle concentric to the plate and extended therefrom in substantially parallel relation to the axis of the plate, said bosses having extended ends disposed substantially in a common plane, and protuberances integral with the plate disposed between alternate bosses in a circle concentric to the plate of a diameter less than that of the circle of the bosses;
   B. finger elements, each of a continuous length of resilient wire material, and each having a bight fitted about a respective protuberance providing opposite leg portions individually extended toward respectively adjacent bosses, helical coil individually continuous with said opposite leg portions of the bight wrapped in the same direction about respective adjacent bosses at least one complete turn, and fingers individually continuous with said coils extended outwardly from the periphery of the backing plate in substantial alignment with the opposite ends of the bight; and
   C. means releasably secured to the backing plate overlaying the bosses and protuberances and releasably capturing the finger elements thereon.

4. A finger wheel comprising:
   A. a substantially circular backing plate;
   B. a plurality of pairs of substantially identical substantially cylindrical bosses integral with the backing plate having axes substantially parallel to the axis of the backing plate and projecting ends disposed in a plane substantially parallel to the backing plate and axially spaced therefrom, said bosses being disposed in a circle substantially concentric to the backing plate and adjacent to the periphery thereof;
   C. a plurality of substantially identical bifurcated finger elements individually related to each of said pairs, each finger element being of a continuous length of resilient wire material and each having
      (1) a pair of helical coils individually wound in circumscribing relation on the bosses of its respective pair of bosses,
      (2) a portion interconnecting the coils, and
      (3) a pair of fingers individually continuous with the coils and extended outwardly from the backing plate; and
   D. a clamping plate releasably mounted on the backing plate in facing engagement with the projecting ends of the bosses to capture the coils on the respective bosses about which they are wound.

5. The finger wheel of claim 4 in which the fingers extend from corresponding sides of their respective bosses, are wound in a common direction about their respective bosses at least one complete turn and the fingers are extended substantially radially from the backing plate.

6. The finger wheel of claim 4 in which the clamping plate is at all points spaced from the backing plate a distance greater than the thickness of the portions of the finger elements disposed therebetween for the flexing movement of said finger elements relative to the backing plate and the clamping plate about said bosses.

7. The finger wheel of claim 4 in which the portion of each finger element interconnecting its coils provides a leg extended from each coil tangentially of its boss substantially radially inwardly of the backing plate and the fingers continuous with the coils are substantially aligned with the legs tangential to the bosses of their respective coils.

* * * * *